United States Patent [19]
Marchant

[11] Patent Number: 4,748,577
[45] Date of Patent: May 31, 1988

[54] LOGARITHMIC DATA COMPRESSION

[75] Inventor: Jeffrey D. Marchant, Chandler, Ariz.

[73] Assignee: Motorola, Inc., Schaumburg, Ill.

[21] Appl. No.: 344,914

[22] Filed: Feb. 2, 1982

[51] Int. Cl.$^4$ .............................................. G06F 1/02
[52] U.S. Cl. ................................................. 364/722
[58] Field of Search ........................ 364/200, 900, 722

[56] References Cited
U.S. PATENT DOCUMENTS 4,199,677 4/1980 Vanderpool ........................ 250/555
4,263,650 4/1981 Bennett et al. ...................... 364/200

Primary Examiner—Thomas M. Heckler
Attorney, Agent, or Firm—Maurice J. Jones; Jonathan P. Meyer

[57] ABSTRACT

Improved logarithmic data compression is achieved by means of a method of finding a more efficient base and a more efficient memory structure. Data compression from a P-bit input word to a Q-bit output word is performed using an optimal base which produces a number of rounded logarithm values equal to $2^Q$ when applied to all of the possible input values. These logarithm values are coded using the available output values to produce a logarithm look-up table. The look-up table is implemented using a multi-stage memory structure which reduces the number of memory devices required for a given table.

3 Claims, 1 Drawing Sheet

LOGARITHMIC DATA COMPRESSION

The government has rights in this invention pursuant to contract number DAAK20-79-C-0262 awarded by the Department of the Army.

FIELD OF THE INVENTION

The present invention relates, in general, to an apparatus for performing logarithmic data compression. More particularly, the invention relates to a more accurate method of logarithmic data compression and a more efficient structure for performing the compression using look-up tables.

BACKGROUND OF THE INVENTION

Logarithmic data compression involves the conversion of input values which lie within a predetermined input range to output values which lie within a predetermined output range such that the output range is smaller than the input range. The conversion is accomplished by finding the logarithm of the input value with respect to a predetermined base. Prior art compression systems determine the base by setting the logarithm to the base A of the maximum possible input value equal to the maximum possible output value.

$$\text{Log}_A \text{ (max input)} = \text{max output} \quad (1)$$

Manipulation of equation (1) readily provides the conventional base for a pair of input and output ranges.

Logarithm functions are inherently non-linear. Specifically, the value of the log function rises steeply at low values of the input and the function rises slowly at the high end of the input range. Since the output of the conventional log compression is simply the value of the log function, the output data will have a non-linear distribution over the output range. At the low end of the input range an increment of one in the input value may result in an increment of two or three in the output value. This means that some available output values are not used. Furthermore, at the upper end of the input range, an increment of one in the input value may correspond to an increment of zero in the output value. So the non-linearity of the log function results in increased ambiguity when the data is re-expanded.

A further inaccuracy inherent in the log function involves an input value of zero. The value of any log function for an input of zero is minus infinity. This is not within the available output range, so either inputs of zero must be prevented or a special output value must be assigned for an input of zero. Conventionally, an output of zero is assigned, which is also the output for an input of one, so an additional ambiguity is introduced.

Log data compression is often accomplished using look-up tables contained in read-only memory (ROM). The digital input value corresponds to an address in the look-up table. The digital word stored at that address is the output value which was calculated using the logarithm function. This is the well known method for implementing non-linear functions. A fundamental limitation on this method arises from the limits of the particular ROM device chosen. For instance, a 1K ROM has 1,024 memory locations and is addressable by a ten-bit word. If such a device is used in a compression having a twelve-bit input range, then four ROMs and some decoding logic will be required to perform the data compression. Of course, it is also possible to use ROMs big enough to be addressed by the desired input word. But at some point there will always be data words too large for the largest available ROMs.

SUMMARY OF THE INVENTION

Accordingly, it is an object of the present invention to provide an improved logarithmic data compression apparatus.

It is a further object of the invention to provide an improved method of logarithmic data compression which utilizes all available output values.

Yet a further object of the present invention is to provide a hardware-efficient method of utilizing ROMs to implement a look-up table.

A particular embodiment of the present invention comprises a logarithm data compression apparatus utilizing a logarithm look-up table in ROM. The base used to calculate the elements of the look-up table is an optimal base chosen so that the number of rounded logarithm values equals the number of output values available in the output range. The elements of the look-up table are the output values, which have a coded correspondence to the rounded logarithm values. A zero output is preferably coded for an input of zero and ambiguity is prevented by coding an output of one for an input of one.

The look-up table is contained in a multi-stage ROM apparatus wherein the number of bits addressed to each stage of the apparatus is less than or equal to the maximum number of bits addressable to an individual ROM device. The first stage accepts the least significant bits of the input word as input and outputs a lesser number of bits due to the log compression. The second stage accepts the output of the first stage and the excess most significant bits of the input word as input and performs a second log compression. A two stage apparatus is described in detail but more stages are feasible. The multi-stage approach described significantly reduces the hardware needed and retains much of the accuracy of optimal base, coded compression.

These and other objects and advantages of the present invention will be apparent to one skilled in the art from the detailed description below taken together with the drawings.

DETAILED DESCRIPTION OF THE INVENTION

Figure 1:
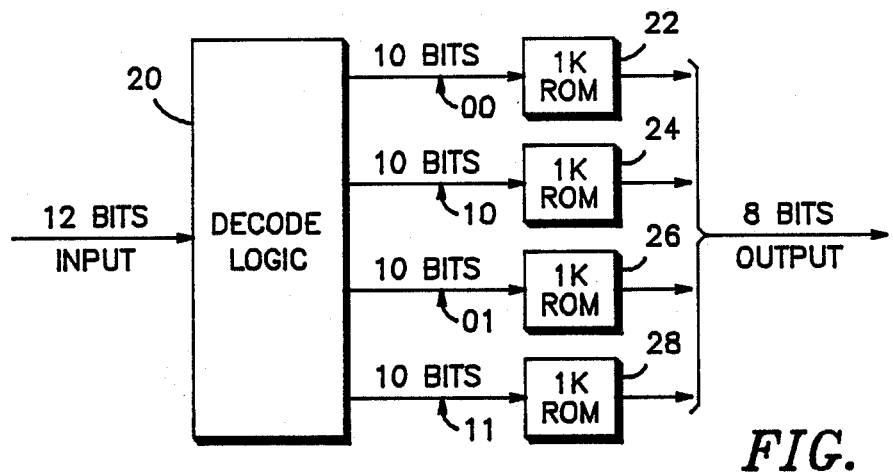
FIG. 1 is a block diagram of an apparatus for performing a twelve-to-eight bit logarithm data compression according to the prior art.

Table I below describes a conventional five-to-four bit logarithm data compression and an optimal base, coded logarithm compression of the same dimensions. The input values are the integers ranging from zero to thirty-one contained in the columns labeled input. The second column of Table I, labeled $\text{Log}_A (I)$, contains the rounded logarithms of the input values using the conventional logarithm base. The conventional base A is derived from equation (1) above. The max input and max output values are easily obtained for any number of input bits P and output bits Q as follows:

$$\text{max input} = 2^P - 1;$$

$$\text{max output} = 2^Q - 1. \quad (2)$$

From equation (1) it can be seen that:

$$A^{\text{max output}} = \text{max input}; \quad (3)$$

$$\ln A = \frac{\ln (\text{max input})}{\text{max output}};$$

$$A = \exp\left[\frac{\ln (\text{max input})}{\text{max output}}\right].$$

As can be seen from Table I, this definition of base A ensures that the output can be represented by four bits, but several possible output values (1,2 and 4) are not used. In a qualitative sense, this means that the output range is not efficiently utilized. As indicated, it is common practice to code an output of zero for a zero input because the true value of the log function cannot be used.

The third column of Table I, labeled $\text{Log}_B$ (I), represents the rounded logarithm values of the input values using an optimal base B. It is immediately obvious that these log values cannot be used as the elements of the look-up table because several of the values are too large to be represented by four bits. It is also noticeable that the optimal base B does not eliminate, by itself, the zero input problem nor the discontinuity of log values at low input values. However, if the number of different rounded logarithm values in the third column is counted, it is found that exactly sixteen different values are present. This is precisely the number of discrete values which can be represented by four bits, so we can code, or map, the set of logarithm values onto the set of output values without skipping any output values. The coded output is contained in the fourth column of Table I and would be used as the elements of a look-up table for an optimal base, coded five-to-four bit logarithmic data compression. In other words, at the address in memory specified by the five bit word 10000 (which corresponds to an integer input of 16) the lookup table would contain the four-bit word 1011 (which corresponds to an integer output of 11). The coded output also solves the zero input problem by allowing the use of different output values for inputs of zero and one. As will be discussed below, if a zero input is prevented by some other means then the output value of zero may be coded for an input of one.

TABLE I

| Input | $\text{Log}_A$ (I) | $\text{Log}_B$ (I) | Coded Output | Input | $\text{Log}_A$ (I) | $\text{Log}_B$ (I) | Coded Output |
|---|---|---|---|---|---|---|---|
| 0 | (0) | ∞ | 0 | 16 | 12 | 15 | 11 |
| 1 | 0 | 0 | 1 | 17 | 12 | 16 | 12 |
| 2 | 3 | 4 | 2 | 18 | 13 | 16 | 12 |
| 3 | 5 | 6 | 3 | 19 | 13 | 16 | 12 |
| 4 | 6 | 8 | 4 | 20 | 13 | 17 | 13 |
| 5 | 7 | 9 | 5 | 21 | 13 | 17 | 13 |
| 6 | 8 | 10 | 6 | 22 | 14 | 17 | 13 |
| 7 | 8 | 11 | 7 | 23 | 14 | 17 | 13 |
| 8 | 9 | 12 | 8 | 24 | 14 | 18 | 14 |
| 9 | 10 | 12 | 8 | 25 | 14 | 18 | 14 |
| 10 | 10 | 13 | 9 | 26 | 14 | 18 | 14 |
| 11 | 10 | 13 | 9 | 27 | 14 | 18 | 14 |
| 12 | 11 | 14 | 10 | 28 | 15 | 18 | 14 |

TABLE I-continued

| Input | $\text{Log}_A$ (I) | $\text{Log}_B$ (I) | Coded Output | Input | $\text{Log}_A$ (I) | $\text{Log}_B$ (I) | Coded Output |
|---|---|---|---|---|---|---|---|
| 13 | 11 | 14 | 10 | 29 | 15 | 19 | 15 |
| 14 | 12 | 15 | 11 | 30 | 15 | 19 | 15 |
| 15 | 12 | 15 | 11 | 31 | 15 | 19 | 15 |

The optimal base B is defined as that base for which the number of rounded logarithm values equals the number of output values. The input value V is defined such that no output values are skipped when the input is decremented by one.

$$\log_B V - \log_B (V - 1) = 1; \quad (4)$$

$$V = \frac{B}{B - 1}.$$

Note that this definition of V will not generally yield an integer value. Later, an integer corresponding to V is defined.

A new variable N is defined as the maximum logarithm value and is used in place of max output to define the optimal base B, as follows:

$$N = \log_B (\text{max input}); \quad (5)$$

$$B = \exp\left[\frac{\ln (\text{max input})}{N}\right];$$

$$\ln B = \frac{\ln (\text{max input})}{N}.$$

Obviously, these are not proper definitions since they are circular, so more equations must be evolved to solve for B, N and V. The desired number of rounded logarithm values is $2^Q$. The number of integers between zero and the maximum logarithm value N is N+2, which is the number of possible rounded logarithm values. Therefore, the number of rounded logarithm values which must be skipped is the number of possible values minus the number of desired values, or:

$$\text{desired\#skipped} = N + 2 - 2^Q \quad (6)$$

Another way to examine the number of values skipped is to compare $\log_B (V)$ and V. Since only integer input values and logarithm values are of interest, consider:

$$V_I = \text{INT} (V + 1); \quad (7)$$

where INT is the integer portion operator.

Recall that, from the definition of V, each input value between zero and V corresponds to a different integer logarithm value after rounding. So that the number of output values needed to code the logarithm values up to and including $V_I$ is $V_I + 1$. The total number of integer logarithm values for inputs of zero through $V_I$, including those skipped, is $(\log_B V_I)_{RND} + 2$ since allowance must be made for inputs of zero and one. Therefore, the actual number of integer logarithm values skipped is:

$$\text{actual\#skipped} = (\log_B V_I)_{RND} + 2 - (V_I + 1). \quad (8)$$

This can be set equal to the number of values desired to be skipped from equation (6):

$$N+1-2^Q=(\log_B V_I)_{RND}-V_I. \tag{9}$$

This leaves four equations (4,5,7 and 9) in four unknowns. Before this set of equations can be solved to obtain the optimal base B, it must be noted that equation (9) assumes that an input increment from $V_I-1$ to $V_I$ results in an increment in the rounded logarithm value of 1, which may not be true since $V_I$ is greater than V. It is possible to proceed on this assumption until a value for the optimal base is established, then check the assumption. If the rounded log values of $V_I$ and $V_I-1$ are the same, then the process of solving for B is simply repeated with a new $V_I$ equal to the old $V_I$ minus 1.

One way to solve the equations is to start with a guess for the value of N and to increment the guess until a value which satisfies the equations is found. Since more than one value of N may satisfy the equations, and the maximum value is desired, equation (9) is changed to:

$$N+1-2^Q > (\log_B V_I)_{RND}-V_{II}. \tag{10}$$

The first value of N which satisfies equation (10) requires more than the available number of output bits, so the desired maximum value of N, $N_{max}$, is one less than the first value which satisfies equation (10). Once $N_{max}$ is found, it is a simple matter of substitution in equation (5) to find the optimal base B. Then the rounded logarithm values are calculated and are coded with the actual output values.

Two conventional measures of error may be used to compare conventional log tables with optimal base, coded log tables. These are the average fractional error and the RMS fractional error. As is well known in the art, the fractional error for each input value is the difference between the input value and the value obtained by compression and re-expansion divided by the original input value. Calculation of average and RMS fractional errors from the list of individual fractional errors is routine. Since conventional logarithm tables which do not compensate for a zero input would have an infinite fractional error for an input of zero, this will be ignored in the following.

Table II below contains error figures for conventional and optimal base, coded logarithm look-up tables of various input and output dimensions. The improved accuracy of logarithmic data compression according to the present invention is apparent.

TABLE II

| # Input Bits | # Output Bits | Error Type | Conventional Log Look-up | Optimal Base, Coded Log Look-up |
|---|---|---|---|---|
| 5 | 4 | $\overline{E}$ | 0.04802 | 0.03451 |
|   |   | $E_{RMS}$ | 0.06835 | 0.05115 |
| 5 | 3 | $\overline{E}$ | 0.10664 | 0.12656 |
|   |   | $E_{RMS}$ | 0.13539 | 0.15722 |
| 6 | 5 | $\overline{E}$ | 0.02860 | 0.01677 |
|   |   | $E_{RMS}$ | 0.03906 | 0.02525 |
| 6 | 4 | $\overline{E}$ | 0.06379 | 0.05731 |
|   |   | $E_{RMS}$ | 0.08005 | 0.07333 |
| 8 | 7 | $\overline{E}$ | 0.00960 | 0.00400 |
|   |   | $E_{RMS}$ | 0.01257 | 0.00603 |
| 10 | 8 | $\overline{E}$ | 0.00646 | 0.00329 |
|   |   | $E_{RMS}$ | 0.00784 | 0.00418 |

TABLE II-continued

| # Input Bits | # Output Bits | Error Type | Conventional Log Look-up | Optimal Base, Coded Log Look-up |
|---|---|---|---|---|
| 12 | 8 | $\overline{E}$ | 0.00807 | 0.00528 |
|   |   | $E_{RMS}$ | 0.00941 | 0.00619 |

$\overline{E}$ = average fractional error
$E_{RMS}$ = RMS fractional error

As described above, prior art logarithmic data compression systems deal with an input of zero in various ways. One method of avoiding the problem is to prevent an input of zero altogether. This approach may be utilized in combination with an optimal base, coded look-up table by simply not allocating an output value for an input of zero. This, of course, allows one more output value to represent the input values and slightly increases the accuracy of the table. Of course, this improvement will be most noticeable in small look-up tables, as is demonstrated by the error figures for the five-to-three bit compression in Table II above. The errors are actually greater for the optimal base, coded system because the infinite fractional error in the conventional system is ignored and the coded system allocates an output value for zero. If it is desired to use a coded system without allocating an output level for zero, then equation (6) is changed to:

$$\#\text{values skipped} = N+1-2^Q \tag{11}$$

Table III below contains values of $N_{max}$ calculated according to the method described above with an output value allocated for an input of zero. The region below the line contains the values for which an optimal base, coded logarithm look-up is less accurate than a conventional look-up if an output value is allocated for an input of zero.

Table III may be used with equation (5) to find an optimal base B for the input and output ranges listed. Other bases may be found by using the method described above. It is also possible that other methods exist for finding a base which will allow a number of rounded logarithm values equal to the number of available output values to be produced from a number of input values. Any other such method is included in the scope of the present invention.

The conventional method of implementing look-up tables for many purposes, including log data compression, is with read-only memory (ROM). The term ROM is used herein to refer to any of the various types of read-only memory, such as programable read-only memory (PROM), which may be used for the purposes described. In such applications, the input word which is to be compressed represents an address in ROM. The appropriate output word is located at that address. Use of a single ROM device to implement a look-up table requires that the number of input bits be less than or equal to the number of address bits that the ROM will accept. This is simply another way of saying that the number of memory locations available in the ROM must be greater than the number required by the input range.

TABLE III $N_{max}$ VALUES

| # OUTPUT BITS | # INPUT BITS |
|---|---|

TABLE III-continued

| # OUTPUT BITS | $N_{max}$ VALUES<br># INPUT BITS | | | | | | | | | | | | | | | | | |
|---|---|---|---|---|---|---|---|---|---|---|---|---|---|---|---|---|---|---|
| | 3 | 4 | 5 | 6 | 7 | 8 | 9 | 10 | 11 | 12 | 13 | 14 | 15 | 16 | 17 | 18 | 19 | 20 |
| 18 | | | | | | | | | | | | | | | | | 1,288,995 | 984,142 |
| 17 | | | | | | | | | | | | | | | | 160,575 | 467,466 | 394,405 |
| 16 | | | | | | | | | | | | | | | 288,326 | 221,430 | 187,341 | 166,020 |
| 15 | | | | | | | | | | | | | | 135,681 | 104,563 | 88,739 | 78,859 | 72,018 |
| 14 | | | | | | | | | | | | | 63,599 | 49,205 | 41,904 | 37,353 | 34,208 | 31,889 |
| 13 | | | | | | | | | | | | 29,678 | 23,064 | 19,718 | 17,638 | 16,203 | 15,147 | 14,335 |
| 12 | | | | | | | | | | | 13,778 | 10,762 | 9,242 | 8,299 | 7,650 | 7,174 | 6,808 | 6,518 |
| 11 | | | | | | | | | | 6,358 | 4,996 | 4,312 | 3,890 | 3,599 | 3,387 | 3,224 | 3,095 | 2,991 |
| 10 | | | | | | | | | 2,913 | 2,305 | 2,001 | 1,814 | 1,686 | 1,593 | 1,522 | 1,466 | 1,420 | 1,382 |
| 9 | | | | | | | | 1,323 | 1,055 | 923 | 842 | 786 | 746 | 716 | 691 | 672 | 656 | 643 |
| 8 | | | | | | | 7 | 422 | 388 | 364 | 348 | 335 | 325 | 317 | 310 | 305 | 300 | |
| 7 | | | | | | 263 | 215 | 191 | 177 | 168 | 161 | 156 | 152 | 148 | 146 | 144 | 142 | 140 |
| 6 | | | | | 114 | 95 | 85 | 80 | 76 | 74 | 72 | 70 | 69 | 68 | 67 | 67 | 66 | 66 |
| 5 | | | | 48 | 41 | 37 | 35 | 34 | 33 | 33 | 32 | 32 | 31 | 31 | 31 | 31 | 31 | 31 |
| 4 | | | 19 | 17 | 16 | 15 | 15 | 15 | 14 | 14 | 14 | 14 | 14 | 14 | 14 | 14 | 14 | 14 |
| 3 | | 7 | 6 | 6 | 6 | 6 | 6 | 6 | 6 | 6 | 6 | 6 | 6 | 6 | 6 | 6 | 6 | 6 |
| 2 | 2 | 2 | 2 | 2 | 2 | 2 | 2 | 2 | 2 | 2 | 2 | 2 | 2 | 2 | 2 | 2 | 2 | 2 |

For instance, a 1K ROM has 1,024 memory locations and can be addressed by a ten-bit word. If it is desired to perform a table look-up with a twelve-bit input word, then either a 4K ROM must be utilized or some arrangement of four 1K ROMs and logic circuits must be used. For reasons of speed or otherwise it may be undesirable or impossible to use a single memory device which is large enough to handle the input word to be operated on.

FIG. 1 is a block diagram of a prior art apparatus for performing a twelve-to-eight bit log data compression using 1K×8 ROMs. A twelve-bit input word enters decode logic 20 which examines the first two bits of the input word. If the first two bits are 00, then decode logic 20 passes the last ten bits to a ROM 22. Similarly, if the first two bits are 01 then ROM 24 receives the last ten bits. ROMs 26 and 28 receive the last ten bits if the first two bits are 10 and 11, respectively. The ROM which receives the last ten bits of the input word contains the appropriate eight bit output word, which is presented at the output of the apparatus.

Figure 2:
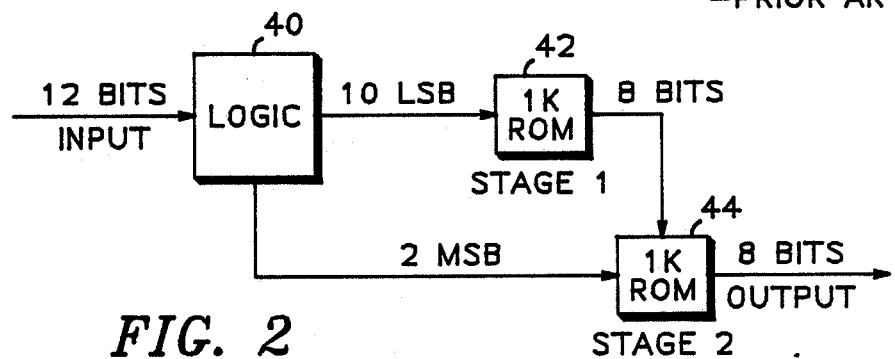
FIG. 2 is a block diagram of a multi-stage twelve-to-eight bit logarithm compression apparatus according to the present invention.

FIG. 2 is a schematic diagram of a twelve-to-eight bit log compression apparatus according to the present invention. A twelve bit input word enters logic 40 to be split into ten least significant bits (LSB) and the two most significant bits (MSB). Of course, if parallel data lines are used rather than serial, no logic 40 will be required. The ten LSB are input to a 1K ROM 42 which represents the first stage of the apparatus. ROM 42 contains the look-up table to perform either a conventional or an optimal base, coded logarithm data compression from ten bits to eight bits. It is also possible to use two 1K ×4 ROMs in place of 1K×8 ROM 42. The resulting eight bits, together with the two MSB from the original input word are input to a 1K ROM 44 which represents the second stage of the apparatus. ROM 44 does not perform an ordinary ten-to-eight bit compression, because that would result in the ten LSB of the original input word being "doubly compressed". Instead, the elements of the look-up table contained in ROM 44 are calculated so as to first re-expand the eight bits received from ROM 42 according to the inverse of the function applied in the first stage. Then, a twelve-to-eight bit compression is applied to produce the final eight bit output word. The details of the compression and re-expansion functions will be apparent from the description above. It is important to note that the second stage of the apparatus does not first re-expand and then compress in a temporal sense. The elements of the look-up table are simply calculated to produce that result.

As is clear from FIGS. 1 and 2, multi-stage logarithm compression can reduce the number of ROM devices required by 50%. In the general case, the reduction in hardware realized by a multi-stage approach is highly dependent on the number of bits in the input and output words. The resulting weight and especially space reductions may be very useful in airborne and other environments. In addition, multi-stage look-up tables may be applicable in other uses in which non-linear functions are utilized.

As is apparent from Table IV below, some decrease in accuracy is experienced when a multi-stage approach is utilized as compared to a single-stage look-up. Table IV contains a comparison of the average Fractional and RMS Fractional errors for various methods of implementing a 12-to-8 bit logarithmic data compression.

TABLE III

| METHOD | $\bar{E}$ | $E_{RMS}$ |
|---|---|---|
| Conventional | 0.00807 | 0.00941 |
| 1 Stage Optimal Base, Coded | 0.00528 | 0.00619 |
| 2 Stage Both Stages Conventional | 0.00862 | 0.01031 |
| 2 Stage Coded - Conventional | 0.00822 | 0.00968 |
| 2 Stage Coded - Coded | 0.00551 | 0.00658 |

The first two methods shown compare the conventional look-up with the optimal base, coded look-up which is the subject of the present invention. The third method in Table IV demonstrates the loss of accuracy experienced in a two-stage look-up table when both stages employ conventional look-up tables. The fourth method is a two-stage table with the first stage employing an optimal base, coded look-up and the second stage employing a conventional look-up. Finally, the fifth method demonstrates the accuracy available in a two-stage look-up table wherein both stages employ optimal base, coded techniques. It should be noted that, while the accuracy of the last method is lower than that of the second, it is still greater than the accuracy of a single-stage conventional look-up.

While only a two-stage look-up is described in detail, the same principles apply to many stages, as will be apparent to those skilled in the art.

Figure 3:
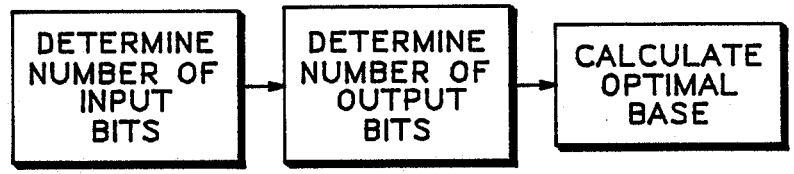
FIG. 3 is a flow chart illustrating a method of finding an optimal base according to the principles of the present invention.

FIG. 3 is a flow chart illustrating the steps required to find an optimal base for logarithmic data compression according to the principles of the present invention. In a first step, a determination is made of the number of input bits in the data words to be compressed. In a second step, a determination is made of the number of bits in the output data words. In a last step, an optimal base is calculated such that the number of rounded logarithm values produced by the application of the optimal base to the set of input values is equal to the number of possible output values. This may be accomplished in accordance with equations (4) through (11), above.

Figure 4:
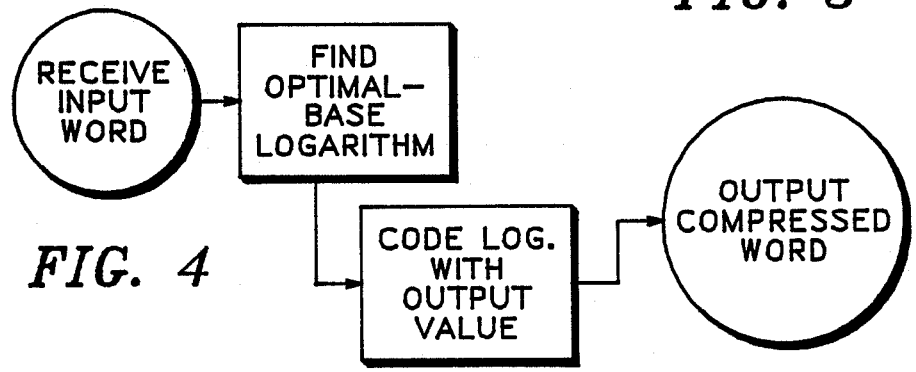
FIG. 4 is a flow chart illustrating a method of logarithmic data compression according to the principles of the present invention.

FIG. 4 is a flow chart illustrating the steps necessary to accomplish logarithmic data compression according to the principles of the present invention. In a first step, an input word is received. In a second step, an optimal base logarithm of the input word is found. In a third step the logarithm found in the second step is coded with one of the available output values. In a last step, this value is output as the compressed data word corresponding to the uncompressed input word.

While the invention has been particularly shown and described with reference to a preferred embodiment thereof, it will be understood by those skilled in the art that various other modifications and changes may be made to the present invention from the principles of the invention described above without departing from the spirit and scope thereof.

I claim:

1. A multi-stage logarithmic data compression apparatus responsive to input word for producing an output word comprising:
    means for separating said input word into a plurality of portions; and
    a plurality of memory stages, a first of said stages being responsive to a first portion of said input word to produce a logarithm according to an optimal base, second and subsequent of said stages being responsive to an output of a previous stage and a portion of said input word to produce a logarithm according to an optimal base, a last of said stages producing said output word.

2. A logarithmic data compression apparatus comprising:
    means for receiving an input data word and for separating it into at least two portions:
    a first look-up stage coupled to said receiving means, said first look-up stage receiving a least significant portion of said input data word as an address and producing an output indicative of, but not necessarily equal to, a logarithm of said least significant portion to an optimal base, said optimal base being chosen to fully utilize a number of available output values; and
    at least one subsequent look-up stage, each coupled to a previous look-up stage and to said means for receiving, each said at least one subsequent stage receiving an output of a previous stage and a portion of said input word as an address and producing an output indicative of, but not necessarily equal to, a logarithm of said address to an optimal base, said optimal base being chosen to fully utilize a number of available output values, a final of said subsequent look-up stages producing an output word indicative of, but not necessarily equal to, a logarithm of said input word.

3. An apparatus for compressing input words of P bits to output words of Q bits comprising:
    means for determining a logarithm of said input words according to a base B, said base B being chosen so that a number of rounded output values equal to $2^Q$ is produced when the logarithm function defined by B is applied to the group of input words comprising all of the integers greater than or equal to zero and less than or equal to $2^P$; and
    means for associating each said rounded output value with an integer greater than or equal to zero and less than or equal to $2^Q$.

* * * * *